United States Patent [19]

de Nora et al.

[11] 4,167,607

[45] Sep. 11, 1979

[54] HALOGEN ELECTRODES AND STORAGE BATTERIES

[75] Inventors: Vittorio de Nora, Nassau, The Bahamas; Placido M. Spaziante, Lugano, Switzerland

[73] Assignee: Diamond Shamrock Technologies S.A., Geneva, Switzerland

[21] Appl. No.: 861,951

[22] Filed: Dec. 19, 1977

[51] Int. Cl.² ............................................. H01M 8/04
[52] U.S. Cl. ...................................... 429/15; 429/27; 429/40
[58] Field of Search .................... 429/15, 13, 14, 16, 429/17, 19, 21, 27–29, 40–46, 229; 204/290 R, 290 F

[56] References Cited

U.S. PATENT DOCUMENTS

| | | | |
|---|---|---|---|
| 3,222,224 | 12/1965 | Williams et al. | 429/42 |
| 3,311,507 | 3/1967 | Dittmann et al. | 429/45 |
| 3,328,202 | 6/1967 | Riffe | 429/229 X |
| 3,840,407 | 10/1974 | Yao | 429/27 |
| 4,038,459 | 7/1977 | Ajami et al. | 429/15 |
| 4,049,532 | 9/1977 | Clerbois et al. | 204/290 F |
| 4,071,660 | 1/1978 | Hart | 429/15 |

*Primary Examiner*—Charles F. LeFevour
*Attorney, Agent, or Firm*—Hammond & Littell

[57] ABSTRACT

A composite halogen electrode for a rechargeable metal-halogen energy storage cell comprises a thin foraminous sheet, typically a valve metal with an electroconductive and electrocatalytic non-passivating coating, in electrical contact over substantially the entire electrode surface with a porous fluid-permeable body for example of carbon fibers or sintered valve metal particles and having throughout its porous structure an active surface coating of electroconductive and electrocatalytic non-passivating material forming a three-dimensional percolating electrode. The foraminous sheet faces an opposing consumable electrode of a storage cell or battery. During charging, halogen evolves essentially at the surface of this sheet and during discharge halogen contained in an electrolyte is ionized as it percolates through the porous body.

41 Claims, 5 Drawing Figures

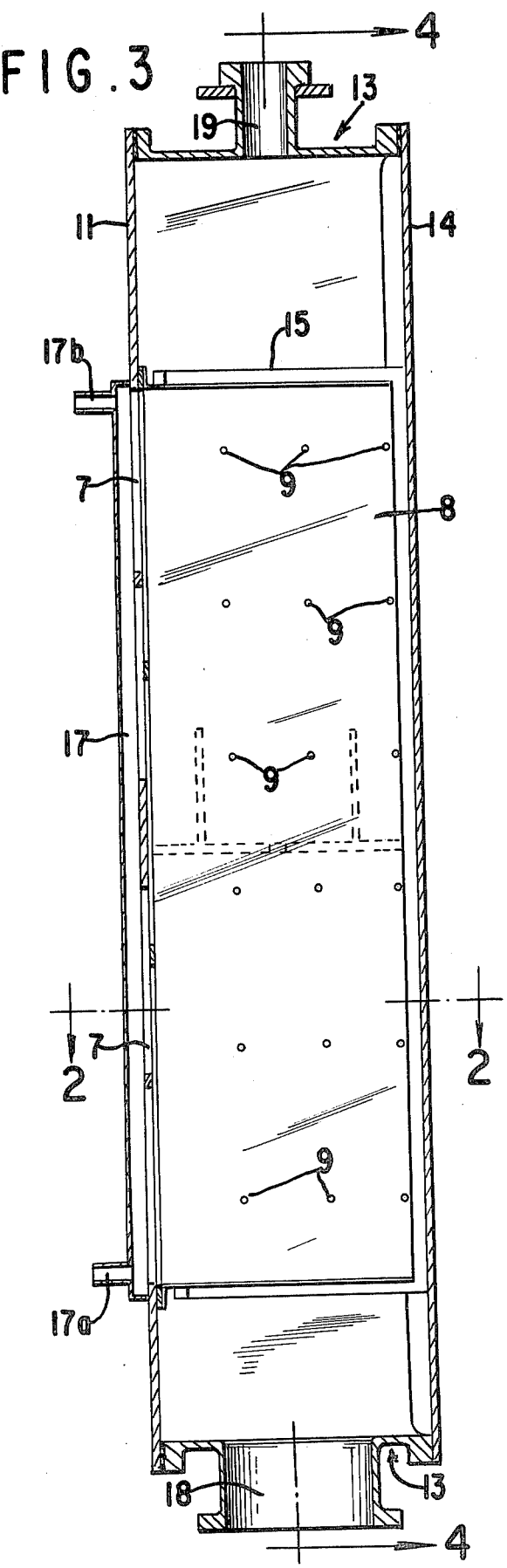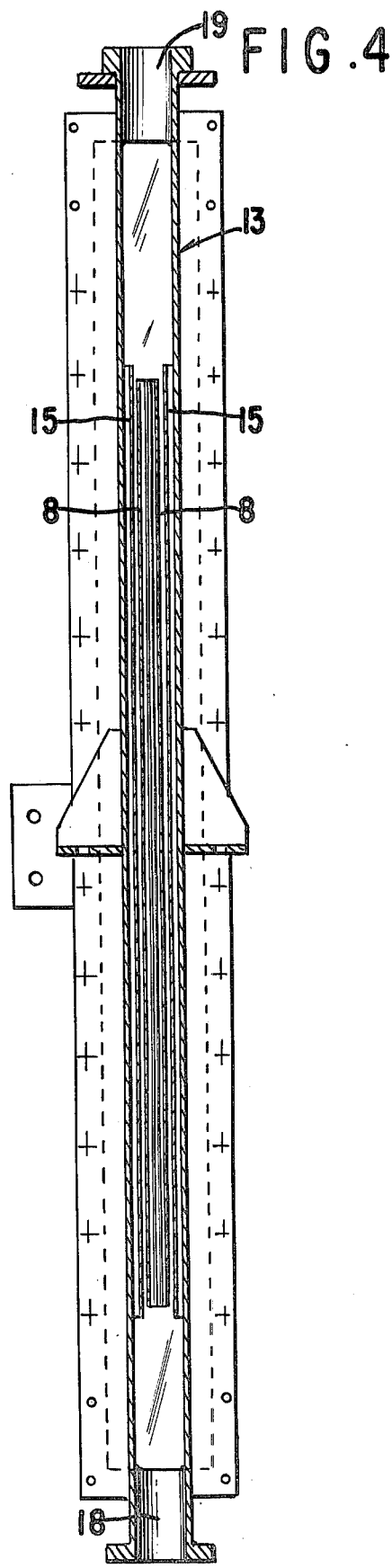

HALOGEN ELECTRODES AND STORAGE BATTERIES

STATE OF THE ART

Electrochemical cells which may be used as rechargeable storage batteries for electrical energy are known wherein during charging a gaseous halogen is generated at the anode ("halogen electrode") of the cell while a metal such as cadmium or zinc contained as a water soluble salt in an aqueous electrolyte is electrodeposited at the cathode ("metal electrode"). During the discharge cycle, the deposited metal is anodically dissolved in the electrolyte losing electrons, and the halogen such as chlorine gains electrons and is ionized at the halogen electrode to form an electrolyte containing metal and halogen ions.

U.S. Pat. No. 3,772,085 is directed to a cell of this type and during the discharge cycle, a solution of elemental chlorine in an aqueous solution of zinc chloride is fed into the cell from behind a porous carbon electrode which is opposed to a second electrode of impervious graphite coated on its outer surface with zinc. As the chlorine containing zinc chloride solution passes through the porous carbon, an electrolytic couple is established thereby generating a voltage between the porous carbon electrode and the zinc coating of the second electrode to produce an electric current in an external circuit between the electrodes.

The porous carbon electrode of this construction has several disadvantages including low conductivity giving rise to undue ohmic drops during operation at high current densities. During the charging cycle, the porous carbon electrode is an inefficient anode for halogen evolution with a high overvoltage which reflects negatively on the overall efficiency of the storage battery. Moreover, porous carbon electrodes are easily consumed during the charging cycle and due to their poor mechanical strength they are easily damaged by pressure pulsations and mechanical shocks.

OBJECTS OF THE INVENTION

It is an object of the invention to provide an improved halogen electrode for rechargeable electrical energy storage cells of the metal-halogen type.

Other objects of the invention are to provide a novel efficient metal-halogen storage cell containing the improved halogen electrode, and a bipolar battery containing series of the cells in bipolar array.

It is an additional object of the invention to provide an improved method of successively conducting halogen discharge and halogen ionization for the purpose of storing electrical energy particularly in load leveling systems.

THE INVENTION

According to the invention, a composite halogen electrode for rechargeable metal-halogen energy storage cells having facing halogen and metal electrodes comprises at least two layers including a first layer and a second layer in electrical contact with each other over substantially the entire electrode surface. The first layer, in use, operatively faces an opposing metal electrode of the cell and is comprised of a thin foraminous sheet of non-corrodible electrically conductive material of which at least the exposed outer surface is non-passivating and electrocatalytically active. The second layer is a porous fluid-permeable body of non-corrodible electrically-conductive material having a non-passivating and electrocatalytic active surface extending throughout its porous structure and forms a three-dimensional percolating electrode.

By foraminous sheet is meant one with voids readily permeable by fluids, the voids extending right through the entire thickness of the sheet and having, seen in projection, a projected void area of more than 50% of the total projected area, preferably more than 75% of the total projected area. By thin is meant that the foraminous sheet is substantially thinner than the porous body of the second layer, preferably 30 or more percent less than the thickness of the porous body. Typically, the foraminous sheet will have a thickness from 0.1 to 2.0 mm and the porous body a thickness from 0.5 to 25 mm. By porous fluid-permeable body is meant a body having a porosity of from about 30 to 70% but substantially without any projected voids through its thickness. The active surface area of the porous body should be at least one order of magnitude greater than its projected surface area, but preferably two or more orders of magnitude greater and in preferred embodiments may be $10^6$ times the projected surface area.

Essentially, the novel halogen electrode of the invention comprises at least two layers, each of which performs definite and different roles in the processes of halogen evolution, halogen ionization and conducting electric current. The halogen electrode advantageously has a foraminous substrate of a passivatable non-corrodible electrically conductive material, preferbly a valve metal such as titanium, tantalum, zirconium, tungsten, niobium, hafnium, silicon, and alloys of one or more of these metals, having an electroconductive coating containing an electrocatalytic non-passivating material of low halogen evolution overpotential. This constitutes the first layer of the composite electrode. This first layer operatively faces the zinc, or like metal, electrode of a storage cell. The back surface of the coated foraminous valve metal substrate supports, and is in electrical contact with, the second layer of the composite halogen electrode which comprises a porous and fluid-permeable body advantageously of carbon or sintered valve metal (including titanium, tantalum, zirconium, tungsten, niobium, hafnium, silicon, and alloys of one or more of these metals) or alternatively other suitable materials such as valve metal carbides, borides and silicides, coated throughout its porous structure with an electroconductive and electrocatalytic non-passivating material having a low overvoltage to the process of halogen ionization. This second layer of the composite halogen electrode of the invention has an exceptionally large real active surface and operates as a tridimensional electrode, i.e., the electrode reaction takes place within the pores throughout the thickness of the fluid-permeable porous body.

In operation of the cell, the first layer of the composite halogen electrode facing the zinc or like metal electrode operates as a halogen ion discharge anode during the charging cycle. Halogen gas is evolved at the surface of the first layer of the composite electrode and is recovered from the cell and stored in ancillary equipment of the plant while zinc or a like metal is deposited on the opposing metal electrode. The electrolyte consisting of an aqueous solution of zinc or like metal halide, preferably zinc chloride or zinc bromide, is passed through the interelectrodic gap between the halogen electrode and the metal electrode.

During the discharge cycle of the cell, deposited zinc or like metal is anodically dissolved, and dissolved chlorine-containing electrolyte is fed from behind the halogen electrode and percolated through the second layer and then passes through the foraminous first layer of the composite electrode whereby the process of ionization of chlorine takes place within the pores of the three-dimensional electrode constituted by the second layer of the halogen electrode.

Surprisingly it has been found that by using the composite halogen electrode of the invention, the processes taking place at the electrode may be significantly optimized. In fact, while it is necessary to provide a very large active surface area of the halogen electrode for high current density operation, it is also true that this is a requisite which is limited to the discharge cycle, i.e. to the ionization process of the halogen which is normally under diffusion control. On the other hand, during the charge cycle, i.e. when the halogen electrode must operate as a halogen discharging anode, the conventional three dimensional electrode structure is not only unnecessary, but it is detrimental to the efficiency of halogen evolution. In fact, the porous structure gives rise to gas plugging or blanketing effects which increase the cell voltage and reflect negatively on the morphology of the deposited zinc or like metal, enhancing dendrite formation and growth. Moreover, a conventional porous electrode formed of carbon is quickly consumed under halogen discharge and has a short life.

With the composite halogen electrode, the process of halogen evolution during the charge cycle takes place essentially on the surface of the first layer of the electrode which is preferably a coated foraminous valve metal, while the porous second layer remains virtually inactive, being effectively screened and protected from the anodic process by the first layer. The process of halogen ionization during the discharge cycle takes place within the three dimensional electrode formed by the porous second layer offering an exceptionally large active surface, while the first layer in effect acts as a current collecting means thereby reducing the ohmic drop through the porous body, bearing in mind that three dimensional electrodes normally show a high electrical resistance due to their very porous and high surface area structures.

Another significant advantage of the halogen electrode of the invention is that the first layer, which conveniently is a coated expanded valve metal sheet, also serves the purpose of a mechanical support for the porous body forming the second layer.

In a preferred embodiment, the first layer of the halogen electrode consists of a coated valve metal substrate or, more generally, an anodically insoluble metal substrate, in the form of a thin foraminous sheet 0.1 to 2 mm thick and this substrate supports, and is in electrical contact with, a body of porous carbon, preferably a fibrous carbon mat, woven or unwoven, having a thickness from 3 to 20 mm. Preferred valve metals are titanium, tantalum, zirconium, tungsten, niobium, hafnium, silicon, and alloys of one or more of these metals. Both the valve metal surface and the carbon surface are coated with a surface layer of a non-passivating electroconductive material which is electrocatalytic to the reactions, and which ideally has a low chlorine overvoltage below 0.3 volts at a current density of 1000 A/m$^2$ or more.

This coating may consist of a platinum group metal (such as platinum, iridium, palladium, rhodium, ruthenium or osmium), cobalt, manganese, nickel, silver, lead or tin and alloys of one or more of these metals, and oxycompounds thereof. Other metals, for example valve metals, tin, lead, antimony, or oxides of such metals, may be present in the conductive coating. This coating is relatively thin and rarely exceeds 0.01 inches, often being less than 0.001 inches, and not only is disposed on the exterior surface of the first layer but also throughout the porous structure of the carbon body.

The electrocatalytic coating is itself well known and is described in a number of patents, including U.S. Patents No. 3,177,131, No. 3,497,445, No. 3,616,445, No. 3,632,498, No. 3,711,385, No. 3,178,551, No. 3,778,363 and No. 3,853,739.

A method of supporting such a porous carbon body in electrically conductive relationship with a coated foraminous valve metal layer comprises enclosing the previously coated porous carbon body between two foraminous valve metal sheets conveniently precoated with the electrocatalytic, non-passivating material. The two coated valve metal foraminous sheets are slightly pressed over the porous carbon body, and are welded around their edges to form a continuous envelope around the porous carbon body. Alternatively, the porous and fluid permeable carbon body may be composed of a compact bed of previously coated carbon particles held between two coated valve metal foraminous sheets.

In these embodiments, the rear valve metal sheet i.e. that furthest away from the opposing metal electrode acts as an extra current collecting means and as a mechanical support for the porous carbon body, while the front valve metal sheet facing the zinc or like metal electrode operates as the halogen-evolving anode during the charge cycle of the cell. Alternatively, the rear valve metal sheet may be replaced by a screen of polytetrafluoroethylene or other chemically resistant material.

According to another embodiment, a suspension of carbon fibers and from 5 to 50% by weight of chemically resistant resin fibers is passed through a foraminous valve metal sheet to deposit a substantial thickness of fiber mixture on the upstream side of the valve metal sheet. The deposit is then slightly pressed and heated to cause softening of the resin which binds the carbon fibers together and to the foraminous valve metal sheet. The coating material is preferably previously applied to the valve metal sheet and to the individual carbon fibers.

Another embodiment of the invention comprises a foraminous valve metal sheet, preferably expanded titanium 0.1 to 2 mm thick, coated on one side with a porous layer 0.5 to 10 mm thick of valve metal particles, preferably titanium with a mesh number between 10 and 100, which are sintered together and to the expanded valve metal sheet to form a porous valve metal body supported by, and in electrically conductive relationship with, the valve metal sheet. The entire composite electrode is then coated with the electrically conductive, electrocatalytic non-passivating material.

The formation of a porous valve metal body may be effected by plasma jet techniques whereby a mixture of valve metal particles and particles of a leachable material such as zinc, iron or aluminum are sprayed onto a foraminous valve metal base. After building up to the desired thickness, the leachable material is dissolved giving rise to the porous body consisting of valve metal particles bonded together and to the foraminous valve metal base. Alternatively, a porous valve metal body may be formed by sintering a slightly pressed layer of valve metal particles over a foraminous valve metal substrate. The porous body preferably has a porosity of between 30 and 70%, ideally about 50%, and a thickness from 1 to 3 mm. Still another embodiment comprises preformed porous sheets or tubes of sintered valve metals such as those commercially available as metallic filter elements spot welded to an expanded valve metal sheet substrate.

During the discharge cycle, the rate of current generation depends inter alia upon (a) the catalytic activity of the surface of the three dimensional electrode constituting the second layer of the composite electrode, (b) the area of this active surface, and (c) the concentration of elemental halogen in the electrolyte.

The electrolyte solution passed through the halogen electrode during discharge is preferably saturated with elemental halogen (typically, chlorine or bromine), and the rate of flow is adjusted to ensure that at least 50%, generally more than 75%, and preferably 90 to 98% of the elemental halogen is absorbed and ionized during passage of the electrolyte through the halogen electrode. Therefore, a particular porous body's characteristics such as specific surface area, catalytic activity, current density related to the projected area, the thickness of the porous body and the rate of flow of the electrolyte through the halogen electrode, are chosen accordingly. Consequently, the three dimensional electrode structure should have a very high surface area, should be very permeable to allow for a sufficient flow of the electrolyte therethrough and have a high catalytic activity.

With some of the preferred porous materials used in the composite halogen electrodes of the invention, in particular with fibrous carbon mats, the three dimensional electrode area provided by the porous layer is often about $10^6$ units of area per unit of volume of the porous body. This high surface area is combined with an exceptionally high permeability which allows for high current density with reduced pumping requirements since the pressure losses through the porous body remain very low, even at high flow rates. Moreover, for a given active surface area the small thickness required for the porous body allows compact cells to be made.

The width and length of the composite electrode are preferably quite substantial compared with its thickness (the measurement from rear to front in the direction of the opposite electrode). It is thus usually in the form of a flat or curved sheet 25 to 100 or more centimeters in length and/or width, and usually between 3 and 20 mm, but rarely exceeding 50 mm in thickness. The coated valve metal sheet of the first layer serves a number of purposes (as does the optional backing sheet). It effectively distributes current over the length and width of the entire electrode, including the porous carbon body or the porous valve metal layer; it reinforces and supports the porous body; and provides good electrical contact with the porous body. Furthermore, it provides external protection against the erosive effects of electrolyte and gas flow as well as minimizing the tendency of disintegration of the porous body, especially when made of carbon, during the charge cycle wherein gaseous halogen is evolved.

The composite electrode construction is especially effective at high current densities, for example at 500 to 2000 amperes per square meter or above, and at these current densities, the electrode exhibits a low halogen over voltage, generally not over 0.3 volts and often well below this value, for example 0.2 volts or less.

In a preferred embodiment, the electrode may be conveniently produced by providing a foraminous valve metal sheet such as a valve metal mesh or expanded sheet substrate with the contemplated coating. The valve metals include titanium, zirconium, tungsten, tantalum, hafnium, niobium, silicon, and alloys of at least one of these metals. Other metals which are anodically corrosion resistant, for example lead, or in some cases stainless steel or nickel, may also be employed. A slurry of carbon fibers and from 5 to 50% by weight of a chemically resistant thermoplastic resin in the form of a fiber or powder, is then caused to flow through the mesh to build up by filtration, and on the upstream side thereof, a layer of the fiber mixture, much in the same manner as an asbestos diaphragm is built up on a cathode in a conventional chlor-alkali diaphragm cell. The built-up layer is then slightly pressed and heated to bind the fibers together and to the coated valve metal base. Subsequently, the porous fibrous layer may be impregnated with a chemically reducible salt solution to catalytic metals and heated to precipitate the metal on the fibers. Alternatively, the catalytic metal may be electrodeposited by a galvanic technique. Carbon fibers may also firstly be felted into a mat and then impregnated to coat the fibers throughout the porous structure. This impregnated cloth felt may then be installed in contact with a coated foraminous valve metal sheet.

Other fibrous materials such as asbestos fibers, plastic fibers, glass fibers or the like may be mixed with the carbon fibers to aid in reinforcing the fibrous mat, in improving its porosity, in binding the fibrous material to the valve metal base, or for other purposes. The amount of such other material may be up to 50% by weight of the entire fibrous structure.

While a preferred embodiment of the invention is concerned with elemental carbon in fibrous state, other forms of carbon such as rigid open-cellular vitreous materials, solid porous graphite plates, and packed beds of graphite particles, capable of passing fluid therethrough and having a large surface area may be impregnated and coated. The coating is usually applied in several layers by alternately impregnating the porous carbon and heating to the conversion temperature until the desired coating thickness is built up throughout the porous structure.

The carbon fibers or carbon particles may be coated with the electrocatalytic material by various methods. A coating of metallic platinum, ruthenium, palladium, iridium, rhodium or osmium may be electrodeposited thereon by forming a stirred slurry of the carbon fibers or particles in contact with a parent cathode disposed in an aqueous solution of the corresponding chloride or nitrate or other soluble salt of the platinum metal and continuing electrolysis until the carbon is well coated. Also the metals may be deposited by applying a platinum group metal resinate or chloride solution coating to the fibers or particles and heating to decompose the platinum group metal salt to metallic state.

A preferred method of providing an electrocatalytic oxide coating is to wet, i.e. by spraying, slurrying, etc. the carbon fibers or particles with a suitable solution of a salt of a platinum group metal and/or of other metals such as cobalt, manganese, tin, lead, nickel and silver, such as platinum chloride, ruthenium trichloride, manganese nitrate, etc., or the corresponding resins of such metals. The wetted fibers or particles are then heated under oxidizing conditions to produce the corresponding metal oxide coating. The heating in this case should be high enough to develop the coating, but low enough to avoid degradation of the carbon. For example, where the heating is conducted in air, the heating time should be relatively short, e.g. 10 to 30 minutes or less, and the temperature should in general not exceed 500° C. and is preferably in the range of 150° to 300° C.

The fibers may be coated individually by tumbling or suspending them (essentially fluidized) in an upwardly rising stream of air or other inert gas, and spraying the tumbling fibers with a solution of the metal compound. The thus coated fibers are then heated, and the process repeated often enough to build up the desired coating thickness. Alternatively, a preformed carbon felt or carbon cloth may be impregnated by immersion into an aqueous coating solution, drained, dried and heated, and this process repeated until a good electrocatalytic coating has been built up.

When oxides are used as the electrocatalytic coating, mixtures may be applied to provide coatings comprising more than one oxide which may be present as such or as a bimetallic or polymetallic oxycompound, especially of a platinum metal, such as a lithium platinate, calcium ruthenate, etc., which may be regarded as oxides of the platinum group metal having valence bonds attached through oxygen or otherwise to other metals. Mixed oxides of ruthenium oxide or other platinum group oxides with oxides of valve metals such as titanium, zirconium, tantalum or the like or oxides of nickel, cobalt, iron, tin, etc., may be provided as disclosed in the U.S. patents identified above.

Two composite halogen electrodes as described above can conveniently be joined together as a multilayer electrode structure, with the first layers facing outwards and the second layers (optionally covered with a foraminous third layer, e.g. a coated valve metal sheet) disposed back-to-back in spaced parallel relationship to define therebetween a space. This space is used, during the discharging phase, for the supply of electrolyte containing elemental halogen which percolates through the second layers and then passes through the first layers.

The invention also concerns a rechargeable metal-halogen energy storage cell comprising at least one halogen electrode and an opposing metal electrode forming an interelectrodic gap, the halogen electrode having the improved composite structure of the invention, as defined above. The cell further comprises means for connecting the halogen electrode and the opposing metal electrode to respective terminals of the cell, means for circulating a metal halide solution through the cell, means for recovering the depleted solution and the evolved halogen gas from the cell during charging of the cell, and means for flowing depleted metal halide solution containing dissolved elememtal halogen through the second and first layers of the the halogen electrode into the interelectrodic gap and for recovering concentrated metal halide solution from the cell during discharging.

According to another aspect of the invention, a rechargeable bipolar metal-halogen energy storage battery comprises a series of cell units each comprising a plurality of the improved composite halogen electrodes as defined above and opposing metal electrodes disposed in spaced parallel relationship and forming interelectrodic gaps, with the second layers of the halogen electrodes disposed in back-to-back pairs to define therebetween a chamber. the battery further comprises bipolar partitions between adjacent cell units, each partition supporting in electrical conducting relationship on one side thereof the halogen electrodes of one cell unit and on the other side thereof the metal electrodes of the adjacent cell unit. The electrodes project at right angles from the bipolar partitions and are spaced apart to interleave with the respective counter-electrodes projecting from adjacent bipolar partitions. The battery also has means for circulating a metal halide solution between the operatively facing electrodes inside each cell during charging of the battery, means for feeding an electrolyte solution containing elemental halogen inside said chambers and for removing the electrolyte solution percolated through the second layer and passing through the first layer of each halogen electrode during discharge of the battery, and means for connecting the terminal halogen electrodes at one side of the bipolar series and the terminal metal electrodes at the opposite side of the bipolar series to the respective poles of an electric source during charging and to an electrical load during discharging.

The novel method of the invention of successively conducting halogen discharge and halogen ionization at the same electrode comprises anodically polarizing an improved composite electrode as defined immersed in a halogen ion containing electrolyte with respect to a cathodically polarized opposed metal electrode to evolve halogen essentially on the surface of of the first layer of the composite electrode facing the metal electrode, and successively passing an elemental halogen-containing electrolyte through the composite electrode whereby the electrolyte firstly percolates through the second layer of the composite electrode which acts as a three dimensional percolating electrode, and then passes through the first layer, the halogen ionizing essentially at the active surface of the second layer of the composite electrode to establish an e.m.f. with the opposed metal electrode.

REFERRING NOW TO THE DRAWNGS

FIG. 3 is an elevational view of the cell of FIG. 2;

FIG. 4 is a cross-sectional along line 4—4 of FIG. 3; and

Figure 1:
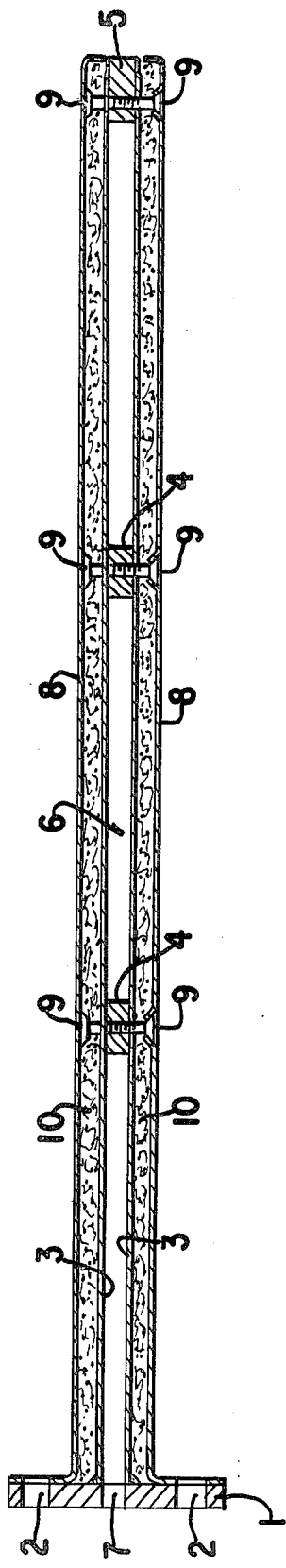
FIG. 1 is a cross-sectional plan view of an embodiment of a multilayer halogen electrode of the invention.

The halogen electrode of FIG. 1 comprises an assembly base strip 1 of titanium provided with a series of assembly holes 2 spaced along the entire length of the electrode. Two flat expanded titanium sheets 3, preferably coated with an electroconductive and electrocatalytic non-passivating material such as a platinum group metal, are welded along one edge to the assembly strip 1 in spaced parallel relationship to each other. A series of titanium buttons 4 are welded to the surface of one of the two sheets 3 and act as spacers to maintain the sheets planar and parallel, and a continuous titanium strip 5 is welded all around the free edges of the two sheets 3 to define an enclosed space or chamber 6 inside the two foraminous sheets 3. Openings 7 are provided in the base strip 1 for feeding the electrolyte into the chamber 6 during discharge.

Two similar expanded titanium sheets 8 previously coated with a layer of electrocatalytic material are assembled by means of titanium screws 9 engaging with threaded holes in the spacing buttons 4 and strip 5. Preactivated carbon felt 10 having a thickness of about 5 mm fills the space between the foraminous titanium sheets 3 and 8, the felt being slightly pressed in place during fitting of the sheets 8.

Figure 2:
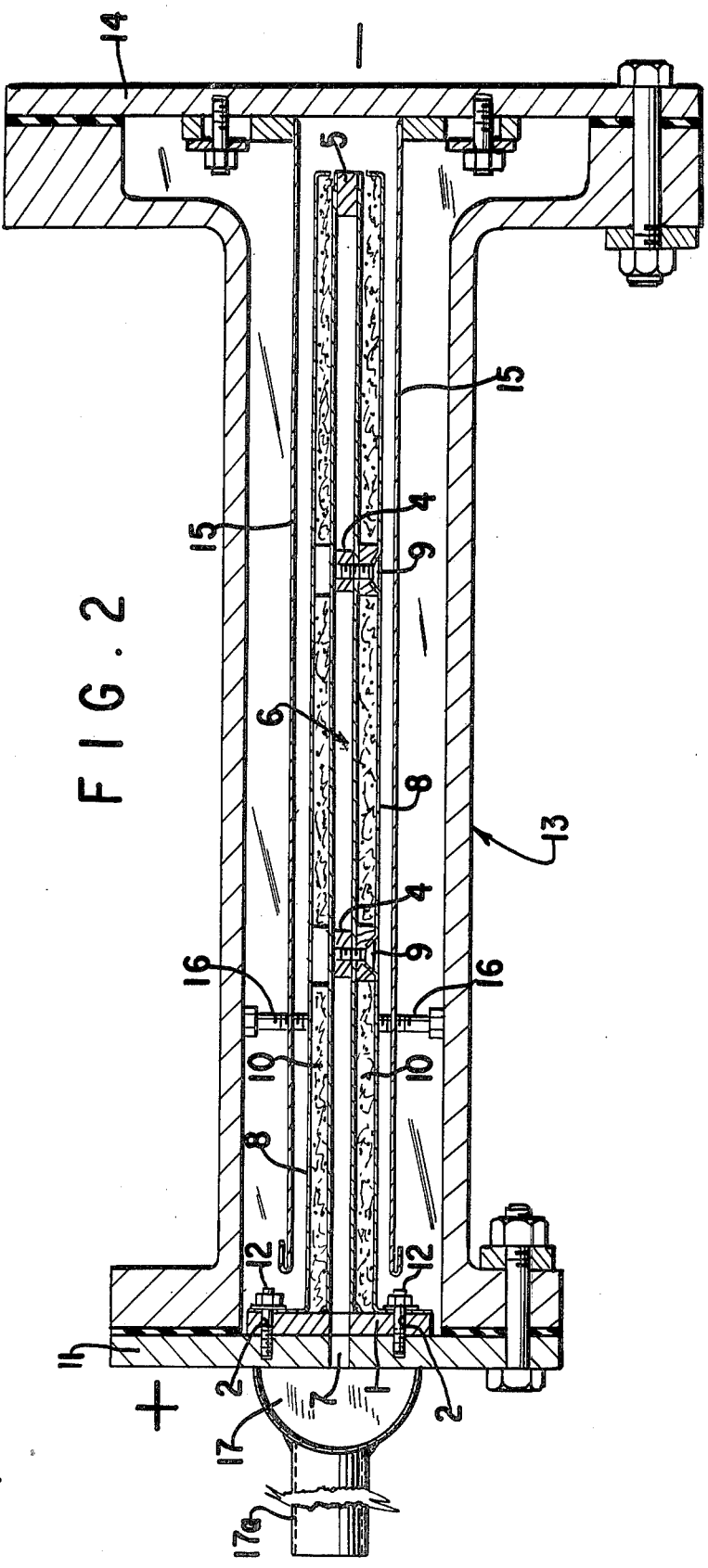
FIG. 2 is a cross-sectional view along line 2—2 of FIG. 3 of a monopolar storage cell of the invention equipped with the halogen electrode of FIG. 1.

FIGS. 2, 3 and 4 illustrate a typical monopolar storage cell of the invention incorporating the composite multilayer halogen electrode shown in FIG. 1 and the components of the halogen electrode are indicated in FIG. 2 by the same numerals used in FIG. 1. The halogen electrode is connected to a positive end plate 11 by a series of screws 12, preferably both made of titanium. The cell comprises a container 13 preferably made of chemically and electrically inert material such as reinforced polyester resin and a negative end plate 14 of titanium or other chemically resistance electrically conductive material. Two metal electrode bases 15, preferably made of titanium or other valve metals, or other chemically resistant and electrically conductive material such as impervious graphite, are connected to and extend from the negative end plate 14. The metal electrode bases 15 extend for almost the entire width of the composite halogen electrode, and are parallel to the respective external coated valve metal sheets 8 of the halogen electrode with a spacing therebetween which may range from 1 to 5 mm. Electrically insulated spacers 16 may be provided to insure a uniform gap between the operatively facing electrodes.

The positive end plate 11 is provided with a channel 17 communicating with the space 6 inside the halogen electrode through the openings 7, the channel being provided with an inlet 17a for feeding electrolyte into the space or chamber 6 and an outlet 17b for circulating the electrolyte. The container 13 is also provided with an inlet 18 in the bottom and with an outlet 19 in the top.

During the charging of the cell, the positive end plate 11 is connected to the positve pole of the electric source, while the negative end plate 14 is connected to the negative pole. An aqueous solution of a halide of zinc or cadmium or similar metal, preferably zinc chloride or zinc bromide, is circulated through the cell by introduction through the inlet 18 and recovery through the outlet 19 while maintaining the inlet 17a and outlet 17b closed by means of valves (not shown).

Halogen gas is evolved at the surface of the coated valve metal sheets 8 constituting first layers of the composite electrode operating as halogen discharge anode during the charge cycle, and the gas is recovered together with depleted electrolyte through the outlet 19. Zinc or like metal deposits on the surface of the metal electrode bases 15 operatively facing the coated valve metal sheets 8. The speed of the electrolyte during the charge cycle within the interelectrodic gap should be high enough to avoid the formation of concentration gradients which is one of the causes of nucleation and growth of dendrites on the metal electrode and is preferably maintained between 10 60 cm/sec. When the charging cycle is completed, the cell may be held in stand-by until there is a requirement for electrical energy. In this case, it is preferable to drain the cell of the electrolyte in order to avoid self discharge effects.

During the discharge cycle, an electrical load is connected to the end plates 11 and 14 of the cell and depleted zinc or like metal halide solution saturated with elemental halogen is fed into the space or chamber 6 through inlet 17a, channel 17 and openings 7. The solution completely fills the cell: part of the solution circulates in the chamber 6 and is withdrawn via outlet 17b; the remainder percolates through the porous body 10 and is continuously withdrawn through either openings 18 or 19. The zinc or like metal layer deposited over the metal electrodes 15 during the charging cycle dissolves anodically, losing electrons, and the elemental halogen contained in the solution percolating through the porous bodies 10 is ionized, gaining electrons. Each porous body 10 constituting a second layer of the composite halogen electrode acts as three-dimensional electrode of exceptionally high active area. The coated valve metal sheets 8 and 3 act, during the discharge cycle, as current collectors and current carrying elements greatly reducing the internal resistance of the cell.

The particular construction of the multilayer halogen electrode of FIGS. 1 to 4 wherein there is an internal chamber 6 for feeding electrolyte during the discharge cycle lends itself to use in a bipolar battery of exceptionally high storage capacity versus overall dimensions of the battery.

Figure 5:
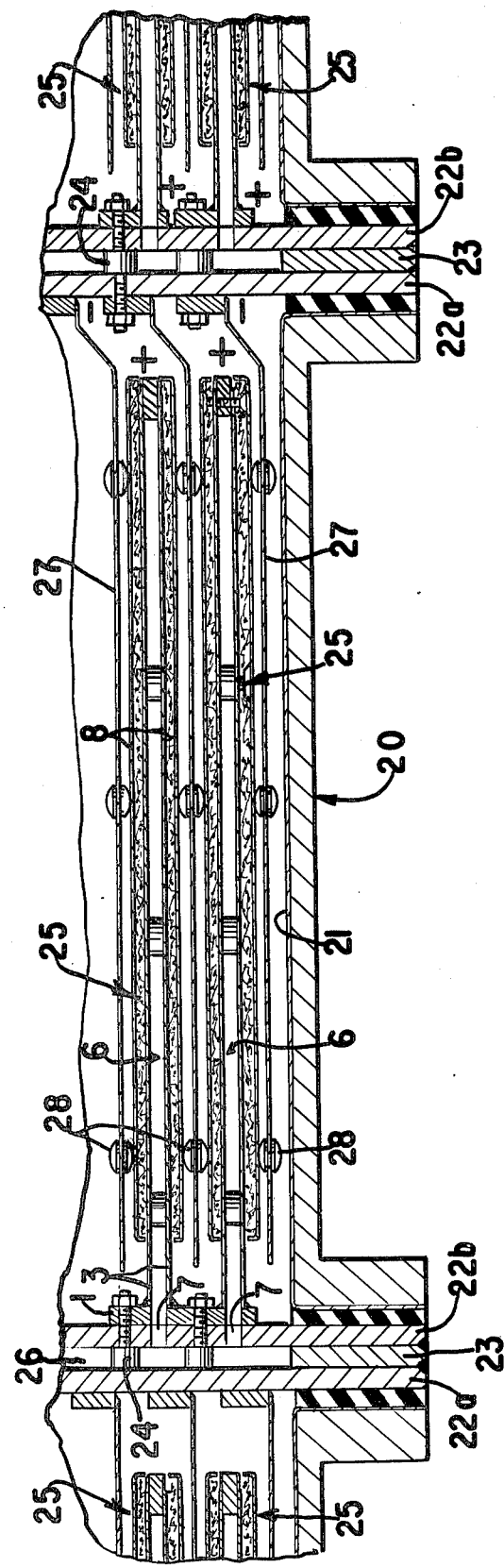
FIG. 5 is a partial cross-sectional view of an embodiment of a bipolar storage battery of the invention.

The main features of an embodiment of a bipolar battery of the invention are illustrated in FIG. 5. As shown, the bipolar battery comprises a series of cell units, each cell unit comprising a series of operatively facing multilayer halogen electrodes 25 and zinc or like metal electrodes 27. FIG. 5 partly shows one intermediate cell unit and two bipolar partitions separating this cell unit from the adjacent cell units. Each cell unit is housed in a flanged container 20 which may be made of inert plastic material or, as shown, of steel clad with a chemically resistant material 21 over the surfaces exposed to the electrolyte.

The bipolar partitions between adjacent cell units are composed of two spaced apart plates 22a and 22b of titanium or other suitable material electrically connected to each other by means of a titanium spacer frame 23 welded along the entire perimeter of the bipolar partition and by welded or threaded spacers 24.

Series of halogen electrodes 25, each having the multilayer structure shown in FIG. 1, are assembled on and extend from the plate 22b, and the internal chambers 6 of the halogen electrodes communicate with the enclosed space 26 between the two plates 22a and 22b by matching openings in both the base strip 1 and the plate 22b. The series of metal electrodes 27 are assembled on and extend from the plate 22a and operatively interleave between outer first layers (formed by coated expanded titanium sheets 8) of adjacent halogen electrodes 25. Series of spacing buttons 28 of electrically insulated, inert material provide a uniform spacing of about 1 to 5 mm between opposed polarity electrodes.

The operative portion of the halogen electrodes 25 is slightly shorter than the facing metal electrodes 27 to reduce the edge effects during the zinc or like metal deposition over the surfaces of the metal electrodes 27, and the portion of the valve metal sheets 3 extending beyond the active multilayered portion of the electrodes to the assembly base strip 1 to which it is welded is imperforate to avoid bypass of electrolyte during the discharge cycle. The enclosed space 26 between the plates 22a and 22b constituting the bipolar partitions of the battery is provided with an outlet and an inlet (not shown) for circulating the halogen-containing depleted metal halide solution during the discharge cycle of the battery. The space 26 acts as a distributor supplying solution through the openings 7 into the chambers 6 inside the halogen electrodes. It will be clear that for all other features not specifically described or visible in FIG. 5, each cell unit of the bipolar battery is similar to the monopolar cell of FIGS. 2, 3 and 4.

The cells and batteries of the invention may be operated at atmospheric pressure or at higher pressure, especially to increase the concentration of elemental halogen in the electrolyte. Moreover, gaseous halogen may be bubbled into the electrolyte in the space behind the halogen electrode during the discharge of the cell to maintain the electrolyte saturated with elemental halogen. For example, the halogen gas may be introduced near the bottom of chamber 6 of FIGS. 2 and 5.

The following examples there are described several preferred embodiments to illustrate the invention.

EXAMPLE 1

Carbon fibers having a fiber length of about 20 mm were washed with perchlorethylene, and the washed fibers were dried at 150° C. The washed fibers were sprayed with a solution containing a proportion of 1 gram of $RuCl_3$ to 4 ml of isopropyl alcohol. The sprayed fibers were placed in an oven and heated under flowing air at 450° C. for 10 minutes to obtain fibers coated with ruthenium dioxide which were suitable for use in the halogen electrode of the invention.

EXAMPLE 2

A felt of carbon fibers was immersed in a solution containing a proportion of 5 g of ruthenium resinate (4% Ru), 2 g of titanium resinate (4.2% Ti), and 3 g of toluene. The felt was then removed from the solution, drained and heated to 400° C. from room temperature by placing it in air in an oven and raising the temperature 50° C. each 5 minute period to 400° C. and then holding the oven temperature at 400° C. for 10 minutes. This process was repeated 12 times with a final heating at 450° C. to obtain a continuous felt of fibers with a coating of ruthenium dioxide and titanium dioxide.

EXAMPLE 3

The procedure of Example 2 was repeated with the following solutions:

| | | |
|---|---|---|
| A. | Isopropyl alcohol | 15 grams |
| | Titanium resinate | 2 grams |
| | Palladium chloride | 4 grams |
| | Toluene | 10 grams |
| B. | Isopropyl alcohol | 18 cc |
| | Iridium chloride | 1 gram |
| | Platinum chloride | 2 gram |
| | Isopropyl titanate | 4 gram |
| | Anise oil | 3 cc |
| C. | TiCl in water (25% $TiO_2$) | 80 cc |
| | Ruthenium trichloride | 1 gram |
| D. | Ruthenium trichloride | 1 gram |
| | Isopropyl alcohol | 4 cc |
| | Linalool | 1.3 cc |
| E. | Palladium chloride | 1 gram |
| | Iridium chloride | 0.1 gram |
| | 36% hydochloric acid | 1 cc |
| | Isopropyl alcohol | 10 cc |
| F. | $RuCl_3$ 2.5 $H_2O$ | 1,192 grams |
| | $SnCl_2$ anhydrous | 5.74 grams |
| | Butyl titanate | 5,580 ml |
| | HCl 36% | 760 ml |
| | Butanol | 11,220 ml |

Other solutions producing metallic coatings include platinum resinate solutions, for example an oil of cloves as well as a mixture in the proportion of 2 g of abietic acid, 2 g of engenol, 1.2 g of chloroplatinic acid and 1.5 ml of ethyl alcohol diluted with one half its volume of engenol.

Preshaped porous carbon plates or a foraminous valve metal sheet supporting a porous layer of valve metal particles bonded together and to the valve metal sheet may be coated in the manner described above, i.e. by impregnation with the coating solution and subsequent heat treatment to convert the salts to the corresponding metal or metal oxides.

When a mat of carbon fibers is deposited onto a foraminous metal layer, suitable binders may be included in the slurry. Organic binders which resist degradation by the reactions conducted in the cell or battery may be used. These include, for example, chlorobutadiene polymer, chlorinated rubber or the like which may also be incorporated into the carbon mat by applying a solution thereof and then vulcanizing the resulting assembly. An especially effective binder which may be dispersed through the carbon fiber mass is a polymeric ion exchanger fluorocarbon having acidic groups such as is disclosed in U.S. Pat. No. 3,853,720, No. 3,624,053, No. 3,282,875 and others. One such polymer is polymeric perfluoro sulfuric acid ion exchange resin sold under the trademark Nafion. An effective way of applying the binder is to spray the electrode assembly after application of the carbon fibers with a solution of Nafion resin and then heating to drive off solvent and/or cure the product if polymerizing and/or vulcanizing agents have been incorporated.

In any event, it is essential that the bonding of the fibers be loose enough to provide a porous carbon fiber mass of high permeability. It is also desirable that the contact between the coated fibers be essentially continuous through the thickness of the carbon body so that the electric current may readily flow from one side to the other over the entire effective area of the electrode with low voltage drop, and the coated valve metal base can pick up the current and voltage generated by the conversion of elemental chlorine to chloride ions at the three-dimensional electrode surface during discharge.

EXAMPLE 4

A test zinc-chlorine cell, substantially as shown in FIGS. 2 to 5, and having a projected electrode area of 72 $cm^2$ and an interelectrodic gap of 3 mm was supplied with an aqueous electrolyte containing 250 g/l of zinc chloride, 50 g/l of $ZnSO_4.7H_2O$, 200 g/l of sodium chloride, 25 g/l of sodium acetate trihydrate and 55 g/l of $AlCl_3.6H_2O$ at a flow of 18 liters per hour. Each first layer (8) of the halogen electrode consisted of a foraminous sheet of expanded titanium 0.5 mm thick coated with 16 $g/m^2$ (as ruthenium metal) of ruthenium, titanium and tin oxides in the ratio 45:54:1 by weight of metal. Each second layer (10) consisted of an 8 mm thick carbon felt as in Example 2, except that it was coated with the same composition as the first layer with an amount corresponding to 70 g of ruthenium metal per square meter of the projected surface area.

During the charging cycle, the voltage current (V-I) characteristics are as follows:

| I-amp. | CD-A/$m^2$ | V-volts |
|---|---|---|
| 0 | 0 | 0 |
| 1.2 | 166 | 2.17 |
| 1.8 | 250 | 2.20 |
| 2.4 | 333 | 2.225 |

-continued

| I-amp. | CD-A/m² | V-volts |
|---|---|---|
| 3.0 | 417 | 2.25 |
| 3.6 | 500 | 2.27 |
| 4.2 | 583 | 2.295 |
| 4.8 | 668 | 2.31 |

During the discharge of the cell, the current density was 500 A/m² and the electrolyte flow rate was 30 liter per hour while the chlorine flow rate was 5 g per hour. The voltagecurrent characteristics were as follows:

| I-amp. | CD-A/m² | V-volts |
|---|---|---|
| 1.2 | 166 | 2.06 |
| 2.4 | 333 | 2.00 |
| 3.6 | 500 | 1.93 |
| 5.0 | 694 | 1.78 |

After 60 cycles of charging and discharging the cell, the current efficiency was 72% and the energy efficiency 62%.

Various modifications of the described embodiments may be made without departing from the spirit or scope of the invention as defined in the appended claims.

We claim:

1. A composite halogen electrode for rechargeable metal-halogen energy atorage cells having facing halogen and metal electrodes, comprising at least two layers including a first layer and a second layer in electrical contact with each other over substantially the entire electrode surface, the first layer being comprised of a thin, foraminous sheet of non-corrodible electrically-conductive valve metal of which at least the exposed outer surface is coated with a non-passivating and electrocatalytically active material, and the second layer being a porous fluid-permeable body of material selected from the group consisting of carbon, sintered valve metals and sintered valve metal carbides, borides and silicides having a coated non-passivating and electrocatalytic active surface extending throughout its porous structure forming a three-dimensional percolating electrode, said exposed outer surface of the first layer operatively facing an opposing metal electrode of the cell and said second layer being disposed behind the plane of the first layer whereby it is effectively screened and protected from anodic processes during charging of the battery.

2. The electrode of claim 1 wherein the first layer is composed of a foraminous substrate of a passivatable non-corrodible electrically-conductive material having an electro-conductive coating containing an electrocatalytic non-passivating material.

3. The electrode of claim 2 wherein the electrocatalytic non-passivating material comprises at least one material selected from the group consisting of platinum, iridium, palladium, ruthenium, rhodium, osmium, cobalt, manganese, tin, lead, nickel, silver, alloys containing at least one of said materials, and oxycompounds thereof.

4. The electrode of claim 2, comprising a second coated valve metal sheet in electrical contact with the back side of said porous body to support and conduct electric current to the porous body.

5. The electrode of claim 1 wherein the substrate is an expanded titanium sheet.

6. The electrode of claim 1 wherein the porous fluid-permeable body comprises a mat of carbon fibers having an electroconductive coating containing an electrocatalytic non-passivating material.

7. The electrode of claim 1 wherein the porous fluid-permeable body comprises a packed bed of carbon particles having an electroconductive coating containing an electrocatalytic non-passivating material.

8. The electrode of claim 1 wherein the porous fluid-permeable body comprises a porous block of carbon having an electroconductive coating containing an electrocatalytic non-passivating material.

9. The electrode of claim 1 wherein the porous fluid permeable body comprises sintered valve metal particles having an electroconductive coating containing an electrocatalytic non-passivating material.

10. The electrode of claim 1, comprising a pair of composite structures each including a first layer in electrical contact with a second layer, the first layers facing outwardly of the halogen electrode to operatively face respective metal electrodes, and the second layers being disposed back-to-back in spaced parallel relationship to define therebetween a space for the supply of electrolyte to percolate through the second layers and then pass through the first layers.

11. The electrode of claim 10 wherein each composite structure comprises a second thin foraminous sheet of non-corrodible electrically conductive material in electrical contact with the back side of the porous body, said second sheets being disposed in spaced parallel relationship to define said space.

12. In a rechargeable metal-halogen energy storage cell comprising at least one metal electrode and halogen electrode forming and interelectrodic gap with an electrolyte containing halogen or halide therein, the improvement wherein the halogen electrode is a composite structure comprising at least two layers including a first layer and a second layer in electrical contact with each other over substantially the entire electrode surface, the first layer being comprised of a thin foraminous sheet of non-corrodible electrically-conductive valve metal of which at least the exposed outer surface is coated with a non-passivating and electrocatalytically active material, and the second layer being a porous fluid-permeable body of non-corrodible electrically-conductive material selected from the group consisting of carbon, sintered valve metals and sintered valve metal carbides, borides and silicides having a coated non-passivating and electrocatalytic active surface extending throughout its porous structure forming a three-dimensional percolating electrode said exposed outer surface of the first layer operatively facing an opposing metal electrode of the cell and said second layer being disposed behind the plane of the first layer whereby it is effectively screened and protected from anodic processes during charging of the battery.

13. A rechargeable metal-halogen energy storage cell comprising at least one halogen electrode and an opposing metal electrode forming an interelectrodic gap, said halogen electrode being a composite structure comprising at least two layers including a first layer and a second layer in electrical contact with each other over substantially the entire electrode surface, the first layer being comprised of a thin foraminous sheet of non-corrodible electrically-conductive valve metal of which at least the exposed outer surface is coated with a non-passivating and electrocatalytically active material, and the second layer being a porous fluid-permeable body of non-corrodible electrically-conductive material selected from the group consisting of carbon, sintered valve metals and sintered valve metal carbides, borides and silicides having a coated non-passivating electrocatalytic active surface extending throughout its porous structure forming a three-dimensional percolating electrode; means for connecting said halogen electrode and said opposing metal electrode to respective terminals of the cell; means for circulating a metal halide solution through the cell; means for recovering the depleted solution and the evolved halogen gas from the cell during charging of the cell; and means for flowing depleted metal halide solution containing dissolved elemental halogen through the second and first layers of the halogen electrode into the interelectrodic gap and for recovering concentrated metal halide solution from the cell during discharge of the cell, said exposed outer surface of the first layer operatively facing and opposing metal electrode of the cell and said second layer being disposed behind the plane of the first layer whereby it is effectively screened and protected from anodic processes during charging of the battery.

14. The cell of claim 13 wherein the first layer of the halogen electrode is composed of a foraminous substrate of passivatable non-corrodible electrically-conductive material having an electro-conductive coating containing an electrocatalytic non-passivating material.

15. The cell of claim 14 wherein the electrocatalytic non-passivating material comprises at least one material selected from the group consisting of platinum, iridium, palladium, ruthenium, rhodium, osmium, cobalt, manganese, tin, lead, nickel, silver, alloys containing at least one of said materials, and oxycompounds thereof.

16. The cell of claim 14 wherein the halogen electrode comprises a second coated valve metal sheet in electrical contact with the back side of said porous body to support and conduct electric current to the porous body.

17. The cell of claim 13 wherein said substrate is an expanded titanium sheet.

18. The cell of claim 13 wherein the porous fluid-permeable of the halogen electrode comprises a mat of carbon fibers having an electroconductive coating containing an electrocatalytic non-passivating material.

19. The cell of claim 13 wherein the porous fluid-permeable body of the halogen electrode comprises a packed bed of carbon particles having an electroconductive coating containing an electrocatalytic non-passivating material.

20. The cell of claim 13 wherein the porous fluid-permeable body of the halogen electrode comprises a porous block of carbon having an electroconductive coating containing an electrocatalytic non-passivating material.

21. The cell of claim 13 wherein the porous fluid-permeable body of the halogen electrode comprises sintered valve metal particles having an electroconductive coating containing an electrocatalytic non-passivating material.

22. The cell of claim 13 wherein each halogen electrode comprises a pair of composite structures each including a first layer in electrical contact with a second layer, the first layers facing outwardly of the halogen electrode to operatively face respective metal electrodes, and the second layers being disposed back-to-back in spaced parallel relationship to define therebetween a space forming said means for flowing depleted metal halide solution containing dissolved elemental halogen through the second and first layers of the halogen electrode.

23. The cell of claim 22 wherein each composite structure comprises a second thin foraminous sheet of non-corrodible electrically conductive material in electrical contact with the back side of the porous body, said second sheets being disposed in spaced parallel relationship to define said space.

24. A rechargeable bipolar metal-halogen energy storage battery comprising a series of cell units each comprising a plurality of halogen electrodes and opposing metal electrodes in spaced parallel relationship forming interelectrodic gaps, each halogen electrode being a composite structure comprising at least two layers including a first layer and a second layer in electrical contact with each other over substantially the entire electrode surface, the first layer being comprised of a thin foraminous sheet of non-corrodible electrically-conductive valve metal of which at least the exposed outer surface is coated with a non-passivating and electrocatalytically conductive material, and the second layer being a porous fluid-permeable body of non-corrodible electrically-conductive material selected from the group consisting of carbon, sintered valve metals and sintered valve metal carbides, borides and silicides having a coated non-passivating and electrocatalytic active surface extending throughout its porous structure forming a three-dimensional percolating electrode, said exposed outer surface of the first layer operatively facing an opposing metal electrode of the cell and said second layer being disposed behind the plane of the first layer whereby it is effectively screened and protected from anodic processes during charging of the battery; bipolar partitions between adjacent cell units, each partition supporting in electrical conducting relationship on one side thereof the halogen electrodes of one cell unit and on the other side thereof the metal electrodes of the adjacent cell unit, said electrodes projecting at right angles from the bipolar partition and being spaced apart to interleave with the respective counter-electrodes projecting from adjacent bipolar partitions with the second layers of the halogen electrodes disposed in back-to-back pairs to define therebetween a chamber; means for circulating a metal halide solution between the operatively facing electrodes inside each cell during charging of the battery; means for feeding an electrolyte solution containing elemental halogen inside said chambers and for removing the electrolyte solution percolated through the second layer and passing through the first layer of the halogen electrode of each cell during discharging of the battery; and means for connecting the terminal halogen electrodes at one side of the bipolar series and the terminal metal electrodes at the opposite side of the bipolar series to the respective poles of an electric source during charging and to an electrical load during discharging.

25. The battery of claim 24 wherein the first layers of the halogen electrodes are each composed of a foraminous substrate of a passivatable non-corrodible electrically conductive material having an electroconductive coating containing an electrocatalytic non-passivating material.

26. The battery of claim 25 wherein the substrates are expanded titanium sheets.

27. The battery of claim 25 wherein the electrocatalytic non-passivating material comprises at least one material selected from the group consisting of platinum, iridium, palladium, ruthenium, rhodium, osmium, cobalt, manganese, tin, lead, nickel, silver, alloys containing at least one of said materials, and oxycompounds thereof.

28. The battery of claim 25 wherein the porous bodies of the halogen electrodes each have a second coated valve metal sheet in electrical contact with the back side of the porous body to support and conduct electric current to the porous body, said second valve metal sheets being disposed in spaced parallel relationship to define said chambers.

29. The battery of claim 24 wherein the porous fluid-permeable bodies of the halogen electrodes each comprise a mat of carbon fibers having an electroconductive coating containing an electrocatalytic non-passivating material.

30. The battery of claim 24 wherein the porous fluid-permeable bodies of the halogen electrodes each comprise a packed bed of carbon particles having an electroconductive coating containing an electrocatalytic non-pasivating material.

31. The battery of claim 24 wherein the porous fluid-permeable bodies of the halogen electrodes each comprise a porous block of carbon having an electroconductive coating containing an electrocatalytic non-passivating material.

32. The battery of claim 24 wherein the porous fluid-permeable bodies of the halogen electrodes each comprise sintered metal particles having an electroconductive coating containing an electrocatalytic non-passivating material.

33. A method of successively conducing halogen discharge and halogen ionization at the same electrode, comprising anodically polarizing a composite electrode immersed in a halogen ion containing electrolyte with respect to a cathodically polarized opposed metal electrode, said composite electrode comprising at least two layers including a first layer and a second layer in electrical contact with each other over substantially the entire electrode surface, the first layer being comprising of a thin foraminous sheet of non-corrodible electrically-conductive valve metal of which at least the exposed outer surface, is coated with a non-passivating and electrocatalytically active material, and the second layer being a porous, fluid-permeable body of non-corrodible electrically-conductive material selected from the group consisting of carbon, sintered valve metals and sintered valve metal carbides, borides and silicides having a coated non-passivating and electrocatalytic active surface extending throughout its porous structure, to evolve halogen essentially on the surface of the first layer facing the metal electrode, and successively passing an elemental halogen containing electrolyte through the composite electrode whereby the electrolyte firstly percolates through the second layer which acts as a three-dimensional percolating electrode and then passes through the first layer, the halogen ionizing essentially at the active surface of the second layer to establish an e.m.f. with the oposed metal electrode said exposed outer surface of the first layer operatively facing an opposing metal electrode of the cell and said second layer being disposed behind the plane of the first layer whereby it is effectively screened and protected from anodic processes during charging of the battery.

34. The method of claim 33, comprising using as first layer a foraminous substrate of a passivatable non-corrodible electrically-conductive material having an electroconductive coating containing an electrocatalytic non-passivating material.

35. The method of claim 34, comprising using an expanded titanium sheet as substrate.

36. The method of claim 34, comprising using as the electrocatalytic non-passivating material at least one material selected from the group consisting of platinum, iridium, palladium, ruthenium, rhodium, osmium, cobalt, manganese, tin, lead, nickel, silver, alloys containing at least one of said materials, and oxycompounds thereof.

37. The method of claim 34, comprising providing a second coated valve metal sheet in electrical contact with the back side of said porous body to support and conduct electric current to the porous body, and passing the elemental halogen containing electrolyte into the porous body through said second valve metal sheet.

38. The method of claim 33, comprising using as the porous fluid-permeable body a mat of carbon fibers having an electroconductive coating containing an electrocatalytic non-passivating material.

39. The method of claim 33, comprising using as the porous fluid-permeable body a packed bed of carbon particles having an electroconductive coating containing an electrocatalytic non-passivating material.

40. The method of claim 33, comprising using as the porous fluid-permeable body a porous block of carbon having an electroconductive coating containing an electrocatalytic non-passivating material.

41. The method of claim 33, comprising using as the porous fluid-permeable body sintered valve metal particles having an electroconductive coating containing an electrocatalytic non-passivating material.

* * * * *